United States Patent [19]
Diehl et al.

[11] 4,206,953
[45] Jun. 10, 1980

[54] HYDROSTATIC BEARING SUPPORT FOR A WORK TOOL

[75] Inventors: Rodney A. Diehl, Bay City; Henry Douglas; Robert W. Watson, both of Saginaw, all of Mich.

[73] Assignee: General Motors Corporation, Detroit, Mich.

[21] Appl. No.: 11,397

[22] Filed: Feb. 12, 1979

[51] Int. Cl.² .................. F16C 7/04; F16C 32/06
[52] U.S. Cl. .................................. 308/9; 269/63
[58] Field of Search .............. 125/11 CD; 269/63; 308/5 R, 9, 36, 36.1, 37, 122, DIG. 1

[56] References Cited
U.S. PATENT DOCUMENTS

| | | |
|---|---|---|
| 3,570,191 | 3/1971 | Williams ........................ 308/9 X |
| 3,650,582 | 3/1972 | Casey ............................ 308/9 X |

Primary Examiner—Frederick R. Schmidt
Attorney, Agent, or Firm—Donald F. Scherer

[57] ABSTRACT

A hydrostatic bearing support for a work tool has an inner stationary member with circumferentially disposed hydrostatic bearing areas which when pressurized, radially support an outer constant thickness cylindrical sleeve. Axial bearing support for the outer sleeve is provided by annular hydrostatic thrust bearing areas disposed at each end of the stationary member and cooperating with end caps which are secured to the outer sleeve. All of the liquid passages for directing pressurized liquid to the bearing members are formed within the stationary member.

2 Claims, 3 Drawing Figures

HYDROSTATIC BEARING SUPPORT FOR A WORK TOOL

This invention relates to bearing supports and more particularly to hydrostatic bearing supports.

The present invention is particularly adapted for use in a grinding wheel dresser wherein the wheel dresser surface is the tool member supported on the hydrostatic bearing and wherein the grinding wheel is selectively moved into contact with the dresser wheel to maintain the desired contour on the grinding wheel.

In the prior art, hydrostatic bearings having been used to support wheel dressers for grinding wheels. In particular, the hydrostatic bearing disclosed in U.S. Pat. No. 3,650,582 to Casey, issued Mar. 21, 1972, and assigned to the assignee of the present invention, has been used. However, since the hydrostatic bearing disclosed in this patent has a stationary outer housing in a rotating shaft, these bearings must be used in pairs with the wheel dresser mounted between the bearing members. While these types of structures have been useful and quite effective, they do have a disadvantage in that the heat generated within the bearing is conducted into the wheel dresser from the ends thereof such that the ends of the wheel dresser expand before the central portion of the wheel dresser, resulting in a slight change in contour of the wheel dresser and therefore a slight change in contour of the grinding wheel during dressing. To overcome this difficulty, it is necessary to discontinue operation of the wheel dresser except when the grinding wheel is to be redressed which, of course, results in a more complex control system and increased operating time of the grinding machine.

The present invention, by incorporating a central stationary support and a constant thickness rotatable sleeve member on which the wheel dresser is mounted, overcomes the thermal expansion difficulties. Because of the constant thickness of the sleeve, the heat generated within the pressurized liquid which provides bearing support is evenly distributed through the sleeve to the wheel dresser.

It is therefore an object of this invention to provide an improved hydrostatic bearing structure for a work tool wherein the tool is supported on a constant wall-thickness, outer cylindrical sleeve which is radially and axially supported for rotation on an inner stationary member by hydrostatic bearing areas formed in the inner member.

These and other objects and advantages of the present invention will be more apparent from the following description and drawings in which.

Figure 1:
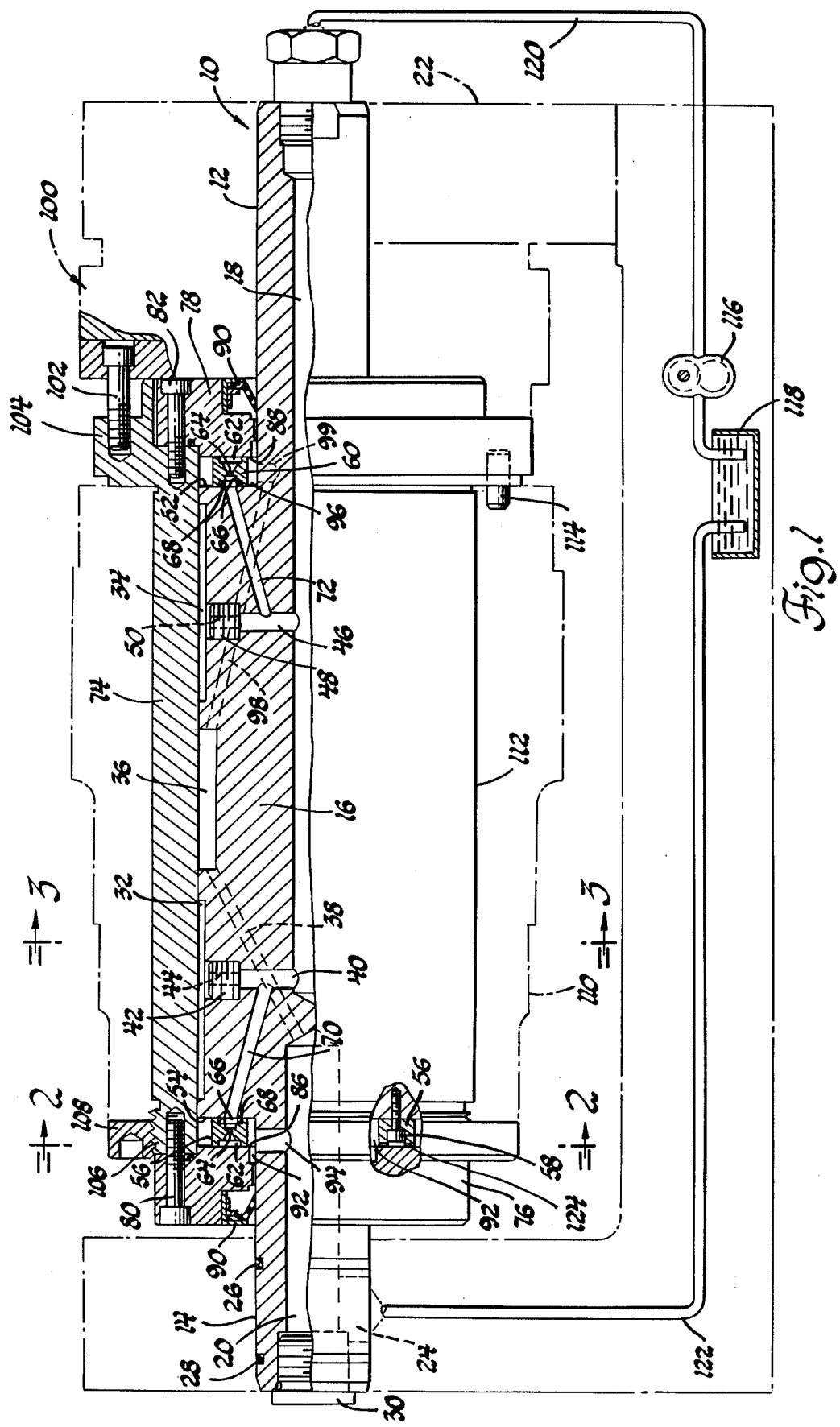
FIG. 1 is an elevational view partly in section.

Referring to the drawings, wherein like characters represent the same or corresponding parts throughout the several views, there is seen in FIG. 1, a cylindrical member generally designated 10 which has equal diameter cylindrical end portions 12 and 14 and a larger diameter central cylindrical portion 16. The member 10 has an inlet passage 18 formed therein which passes coaxially through end 12 and substantially past the center of the enlarged diameter portion 16. A return passage 20 is formed in the member 10 coaxially with and extending through end 14 and into the central portion 16. The passages 18 and 20 are preferably coaxial but do not intersect. The ends 12 and 14 are supported in a base designated 22 and shown in phantom line. The end 14 has a cross-drilled passage 24 which intersects passage 20. Leakage from passage 20 along the outer surface of end 14 is prevented by a pair of seal rings 26 and 28. The outer end of passage 20 is closed by a plug member 30.

Figure 3:
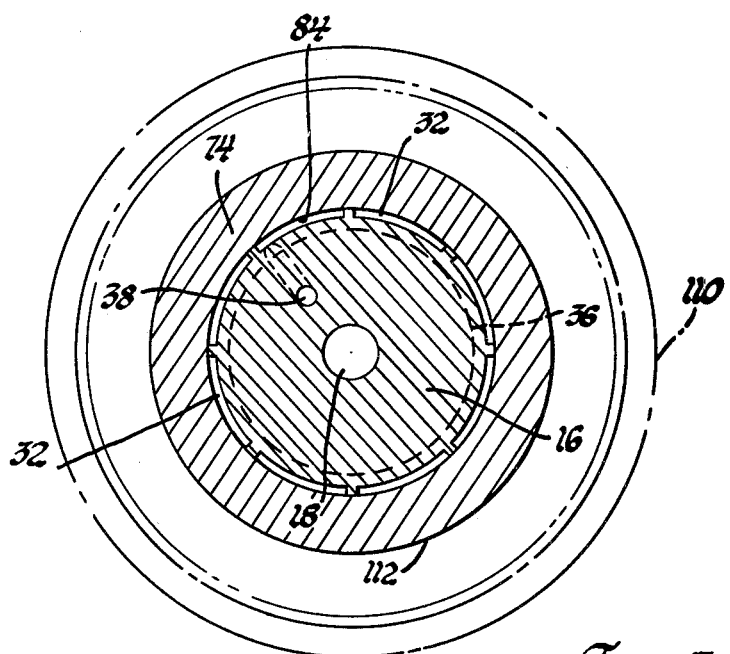
FIG. 3 is a sectional view taken along line 3—3 of FIG. 1.

The central portion 16 has a plurality of spaced recesses 32 and 34 formed on the outer circumferential surface thereof. The recesses 32 are separated from the recesses 34 by a central annular recess 36 which is connected by a cross-drilled passage 38 to the return passage 20. As seen in FIG. 3, there are eight equally spaced recesses 32, and since recesses 32 and 34 are substantially identical, there are eight recesses 34. Each recess 32 is connected with the inlet passage 18 by cross-drilled passages 40 and threaded members 42 which have a central restricted passage 44 formed therein. Each of the recesses 34 is connected with the inlet passage 18 through cross-drilled passages 46 and threaded members 48 which have a restricted passage 50 formed therein. The threaded members 42 and 48 are preferably identical in structure.

Figure 2:
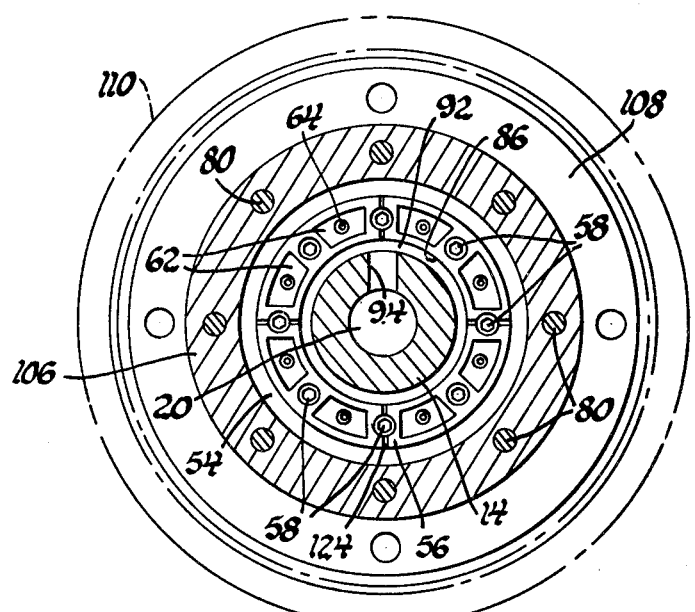
FIG. 2 is a sectional view taken along line 2—2 of FIG. 1.

As can be seen in FIG. 1, there is an annular surface 52 formed on the right end of central portion 16 and an annular surface 54 formed on the left end of central portion 16. An annular thrust bearing 56 is secured to the annular surface 54 by a plurality of cap screws 58 and an annular thrust bearing 60 is secured in a similar manner to the annular surface 52. The annular thrust bearings 56 and 60 are identical such that only the description of 56 is believed necessary for the understanding of the present invention. As can be seen in FIGS. 1 and 2, the thrust bearing 56 has eight equally spaced recesses 62 formed in the outer face thereof, each of which recesses 62 are connected through a restriction 64 with an inner recess 66. Each recess 66 cooperates with a seal member 68 which prevents leakage between the inner surface of annular thrust bearing 56 and annular surface 54. As can be seen in FIG. 2, the fasteners 58 are disposed intermediate the recesses 62. The corresponding recesses on thrust bearing 60 have been given the same numerical designation as the recesses formed in thrust bearing 56. Each recess 66 of thrust bearing 56 is connected with respective passages 40 by respective cross-drilled passages 70, which each of the recesses 66 formed in thrust bearing 60 is connected with respective passages 46 by respective cross-drilled passages 72.

An outer constant-thickness, cylindrical sleeve 74 is mounted on the central portion 16 and is positioned thereon by a pair of end caps 76 and 78 which are secured to the sleeve 74 by fasteners 80 and 82. The cylindrical sleeve 74 has a smooth constant diameter inner surface 84 which is disposed in close proximity to the outer surface of recesses 32 and 34. The end caps 76 and 78 have annular surfaces 86 and 88, respectively, which are disposed in close proximity to the outer annular surfaces of thrust bearings 56 and 60, respectively. The end caps 76 and 78 have conventional lip seals 90 disposed therein, which lip seals 90 cooperate with end portions 12 and 14 to prevent liquid communication between the atmosphere and the internal portions of the bearing structure.

An annular space 92 is formed between the thrust bearing 56 and end 14, which space 92 is in liquid communication with passage 20 through a radial passage 94. An annular space 96 formed between thrust bearing 60 and end 12 is in liquid communication with recesses 36 through a cross-drilled passage 98 and radial passage 99. A conventional hydraulic motor, shown in phantom line and designated 100, is rotatably supported on end 12 and secured, by a plurality of fasteners 102, to a flange 104 which is formed on the right end of sleeve 74. The left end of sleeve 74 has a threaded portion 106 on which is threaded a retaining member 108. A wheel dresser, shown in phantom outline at 110, is disposed on the outer surface 112 of sleeve 74 between the retaining member 108 and the flange 104. The wheel dresser 110 is positioned on the surface 112 by a pair of locating pins 114, only one of which is shown. The other locating pin 114 is preferably diametrically opposed to the position of the shown pin.

Liquid, preferably hydraulic oil, is supplied to inlet passage 18 by a conventional positive displacement pump 116. The liquid is stored in a reservoir 118 and is directed from the pump 116 through a passage 120 to the inlet passage 18. Liquid returns from passage 20 through passage 122 to the reservoir 118. The same pump 116, or a separate pump, may be used to supply liquid under pressure to the hydraulic motor 100. It will be appreciated by those skilled in the art, that any conventional rotary drive device can be used in place of hydraulic motor 100 to induce rotation of the cylindrical sleeve 74 on which the wheel dresser 110 is located.

The pressurized liquid in passage 18 is distributed to the recesses 32 and 34 through passages 40 and 46, respectively. The liquid under pressure in those recesses 32 and 34 provides radial support for the sleeve 74 in the well-known manner of hydrostatic bearing. The recesses 62 of thrust bearings 56 and 60 are supplied with pressurized liquid through passages 70 and 72 to provide hydrostatic bearings which will support the axial thrust loading induced on the cylindrical member 74 during operation of the wheel dresser.

As is well-known in hydrostatic bearings, the fluid leakage from the bearing pads is returned to the central reservoir and this is accomplished by return passage 20. It should be appreciated that the fluid which leaks from the recesses 32 and 34 will return either through the central recesses 36 or will pass through drain passages, such as 124, formed in the thrust bearings 56 and 60 at a location intermediate the recesses 62. The leakage from thrust bearing 56 will return via passage 94 to passage 20 while the leakage from thrust bearing 60 will return via passages 99 and 98 to recess 36 and then through passage 38 to passage 20.

Because of the constant wall thickness of sleeve 74, the heat generated within the liquid of the hydrostatic bearing will be conducted to the wheel dresser 110 along its entire length at a substantially equal rate. Thus, the thermal expansion of the wheel dresser will not occur from the outer ends toward the center thereof, as has been found in the prior art.

While the subject hydrostatic bearing has been described as being used with a wheel dresser, it should be obvious to those skilled in the art, that other rotary tools could be mounted on the present hydrostatic bearing support. Also, as previously mentioned, various types of rotary drives can be used to rotate the sleeve member 74. It is also possible to provide a conventional fluid fitting in the end of passage 20 to provide the liquid outlet connection thereby eliminating the cross-drilled passage 24.

The embodiments of the invention in which an exclusive property or privilege is claimed are defined as follows:

1. A support spindle for a rotary tool comprising: a stationary shaft having an enlarged central cylindrical portion, cylindrical suppport means adjacent each end of said enlarged cylindrical portion and cooperating with said central cylindrical portion to form an annular end surface on each end of said central cylindrical portion, a pair of spaced recesses formed in the outer surface of said central cylindrical portion, a return recess formed in said central cylindrical portion intermediate the spaced recesses; inlet liquid passage means concentric with and extending coaxially through one of said cylindrical support means and also being coaxial with and extending into said central cylindrical portion a distance beyond said return recess; feed passage means for communicating liquid from said inlet passage means to both of said spaced recesses and to both of said annular end surfaces of said central cylindrical portion; outlet luquid passage means concentric with and extending coaxially through the other of said cylindrical support means and also being coaxial with and extending into said central cylindrical portion a distance less than said inlet passage means extends into said central cylindrical portion; return passage means for providing liquid communication between said annular end surfaces, said return recess and said outlet liquid passage means; a cylindrical sleeve rotatably mounted on said central cylindrical portion and cooperating with said spaced recesses to provide a pair of radial support hydrostatic bearings; a pair of end cap means secured to said cylindrical sleeve and enclosing said annular end surfaces and cooperating therewith to provide a thrust chamber at each end of said central cylindrical portion; annular thrust bearing means in each of said thrust chambers in liquid communication with said feed passage means and providing controlled liquid communication with said return passage means and cooperating with said end cap means to provide a pair of hydrostatic thrust bearings; a work tool secured to said cylindrical sleeve intermediate said end cap means for rotation with said cylindrical sleeve and said end cap means; means supplying pressurized liquid to said inlet passage means; and means for rotating said cylindrical sleeve relative to said stationary shaft.

2. A support spindle for a rotary tool comprising: a stationary shaft having an enlarged central cylindrical portion, cylindrical support means adjacent each end of said enlarged central cylindrical portion and cooperating with said central cylindrical portion to form an annular end surface on each end of said central cylindrical portion, a pair of spaced recesses formed in the outer surface of said central cylindrical portion, a return recess formed in said central cylindrical portion intermediate the spaced recesses; inlet liquid passage means concentric with and extending coaxially through one of said cylindrical support means and also being coaxial with and extending into said central cylindrical portion a distance beyond said return recess; feed passage means for communicating liquid from said inlet passage means to both of said spaced recesses and to both of said annular end surfaces of said central cylindrical portion; outlet liquid passage means concentric with and extending coaxially through the other of said cylindrical support means and also being coaxial with and extending into said central cylindrical portion a distance less than said inlet passage means extends into said central cylindrical portion; return passage means for providing liquid communication between said annular end surfaces, said return recess and said outlet liquid passage means; a cylindrical sleeve rotatably mounted on said central cylindrical portion having a constant thickness for the length of said enlarged central cylindrical portion and cooperating with said spaced recesses to provide a pair of radial support hydrostatic bearings; a pair of end cap means secured to said cylindrical sleeve and enclosing said annular end surfaces and cooperating therewith to provide a thrust chamber at each end of said central cylindrical portion; annular thrust bearing means in each of said thrust chambers in liquid communication with said feed passage means and providing controlled liquid communication with said return passage means and cooperating with said end cap means to provide a pair of hydrostatic thrust bearings; a work tool secured to said cylindrical sleeve intermediate said end cap means for rotation with said cylindrical sleeve and said end cap means; means supplying pressurized liquid to said inlet passage means; and means for rotating said cylindrical sleeve relative to said stationary shaft.

* * * * *